United States Patent [19]

Dingus et al.

[11] Patent Number: 4,519,489

[45] Date of Patent: May 28, 1985

[54] CAN END SAMPLER

[75] Inventors: Jack D. Dingus, Russell County; Edward C. Gilliam, Washington County, both of Va.

[73] Assignee: Reynolds Metals Company, Richmond, Va.

[21] Appl. No.: 662,805

[22] Filed: Oct. 22, 1984

Related U.S. Application Data

[63] Continuation of Ser. No. 508,083, Jun. 27, 1983, abandoned.

[51] Int. Cl.³ ............................................. B65G 11/20
[52] U.S. Cl. ................................. 193/31 R; 73/863.41
[58] Field of Search ........................... 193/31 R, 31 A; 198/359, 360; 73/863.41, 863.91, 863.92

[56] References Cited

U.S. PATENT DOCUMENTS

| 1,944,963 | 1/1934 | Bradford et al. ........................ 73/21 |
| 2,168,500 | 8/1939 | Steinhauer ............................. 193/17 |
| 2,359,641 | 10/1944 | Harlow ................................ 73/421 |
| 2,428,103 | 9/1947 | Vergobbi ............................... 86/47 |
| 2,515,965 | 7/1950 | Nurnberg ............................. 193/31 R |
| 2,601,785 | 7/1952 | Pottle .................................... 73/421 |
| 2,761,560 | 9/1956 | Pomernacki .......................... 209/88 |
| 3,435,685 | 4/1969 | Watkin et al. ........................ 73/432 |
| 3,603,458 | 9/1971 | Bliss .................................. 209/111.6 |
| 3,878,726 | 4/1975 | Hamatini ........................... 73/421 R |

FOREIGN PATENT DOCUMENTS

| 894375 | 10/1953 | German Democratic Rep. ... 193/31 R |
| 2060536 | 5/1981 | United Kingdom ............. 193/31 A |

Primary Examiner—Jeffrey V. Nase
Attorney, Agent, or Firm—Alan T. McDonald

[57] ABSTRACT

An apparatus for sampling can ends from a can end forming line is disclosed. The device includes first and second chutes and deflectors for deflecting can ends between the chutes. An optional door may be provided as a portion of one of the chutes to further deflect certain ends from the system.

6 Claims, 2 Drawing Figures

CAN END SAMPLER

This application is a continuation of application Ser. No. 508,083, filed June 27, 1983, now abandoned.

BACKGROUND OF THE INVENTION

Each day, millions of beverages, such as soft drinks and beer, are consumed from metallic cans. Such cans are formed from cylinders or shells and have at least one end closure affixed thereto. The substantial majority of such can ends now include an easy-opening feature thereon. These easy-opening features are formed by such metal working processes as stamping, drawing, scoring and the like. Careful control must be maintained of the end forming process, since close tolerances must be maintained to produce an end in which the easy-opening feature will function as designed while at the same time produce an end which will not prematurely leak or otherwise fail under the internal pressures of a carbonated beverage packaged within the can. Such pressures may exceed 90 lbs. per square inch (6327.9 kg per square meter).

In order to maintain process control, it is common practice to test sample ends at regular intervals. Typically, a packing line operator will isolate several ends for test for every sleeve of ends packaged. A sleeve of ends contains approximately 200 ends. When a sufficient quantity of isolated ends have been gathered, they are transferred to a test station where they are punished and tested under pressure. Of course, prior to and during the testing of these ends, the end line is still producing ends. Should any of the test ends fail, all ends produced on the end line from the time of the initial failure must be individually tested until the cause of the failure is determined and is corrected. This requires unpackaging, testing and repackaging of thousands of ends.

In co-pending U.S. application Ser. No. 508,081 filed June 27, 1983, now U.S. Pat. No. 4,495,797 an apparatus is disclosed for testing sample ends in line with the can end forming operation to give substantially immediate feedback on end quality. In order for such an apparatus to function, the apparatus must be fed sample ends from the end forming line at regular intervals. It is thus desirable to produce a device which periodically isolates sample ends from the can end forming line for direction to a testing station.

THE PRESENT INVENTION

By means of the present invention, this desired goal has been obtained.

The can end sampler of the present invention comprises a pair of chutes and means for guiding can ends to one of the chutes. The first chute forms a portion of the travel of a can end through the normal can line operation and thus may act as a stacker between a pair of endless belts along which the can ends travel. The second chute acts as a feeder for gathering sample ends for testing or other purposes.

The second chute may also include a door means which may open and close to further deflect certain ends to scrap.

When employing the apparatus of the present invention, the deflector at regular intervals deflects ends from its normal path to the first chute means onto a second chute means for sampling or to scrap.

BRIEF DESCRIPTION OF THE DRAWINGS

The can end sampler of the present invention will be more fully described with reference to the drawings in which.

DETAILED DESCRIPTION OF THE PREFERRED EMBODIMENT

Figure 1:
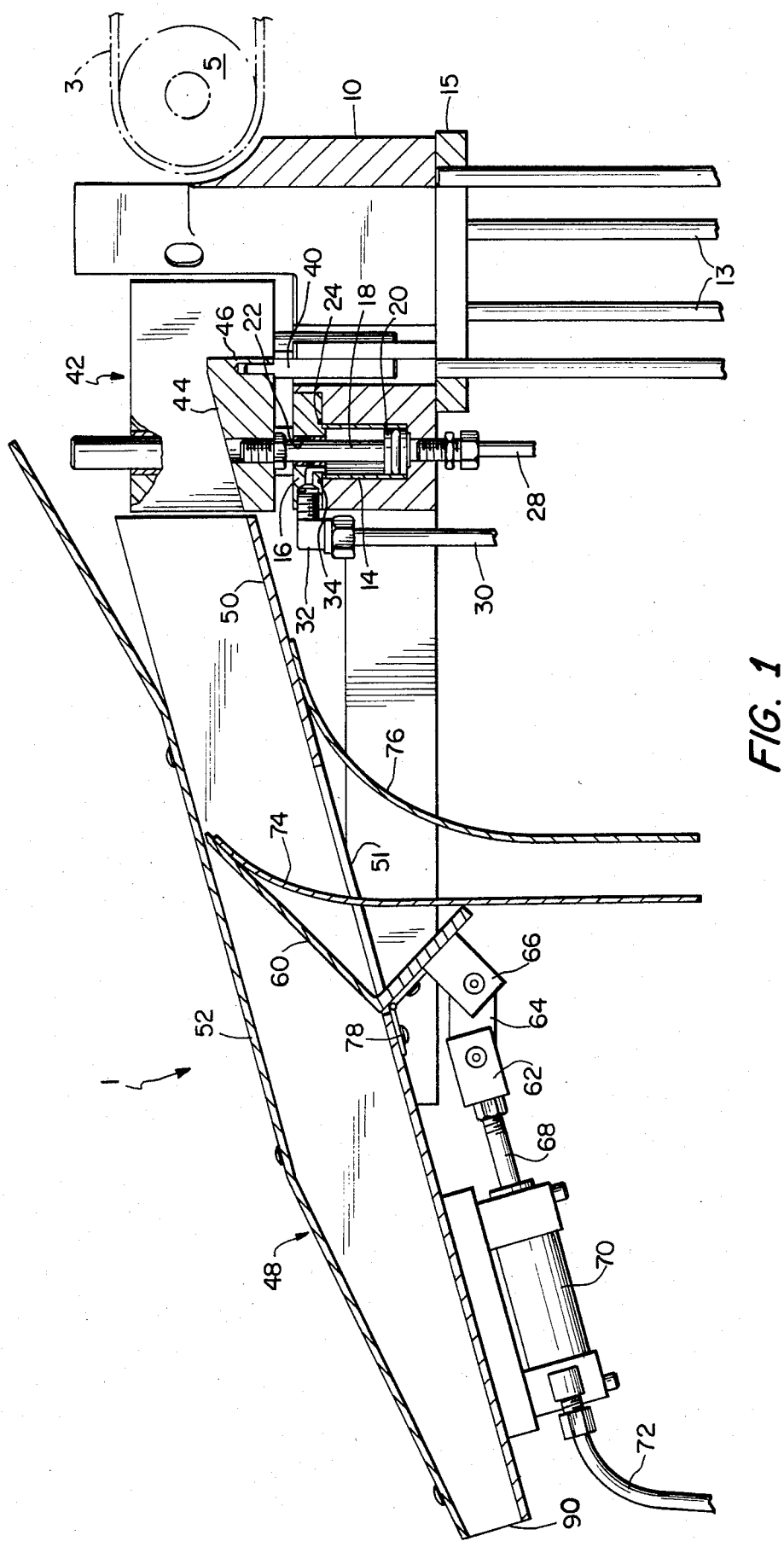
FIG. 1 is a front cross-sectional view of the can end sampler of the present invention.
Figure 2:
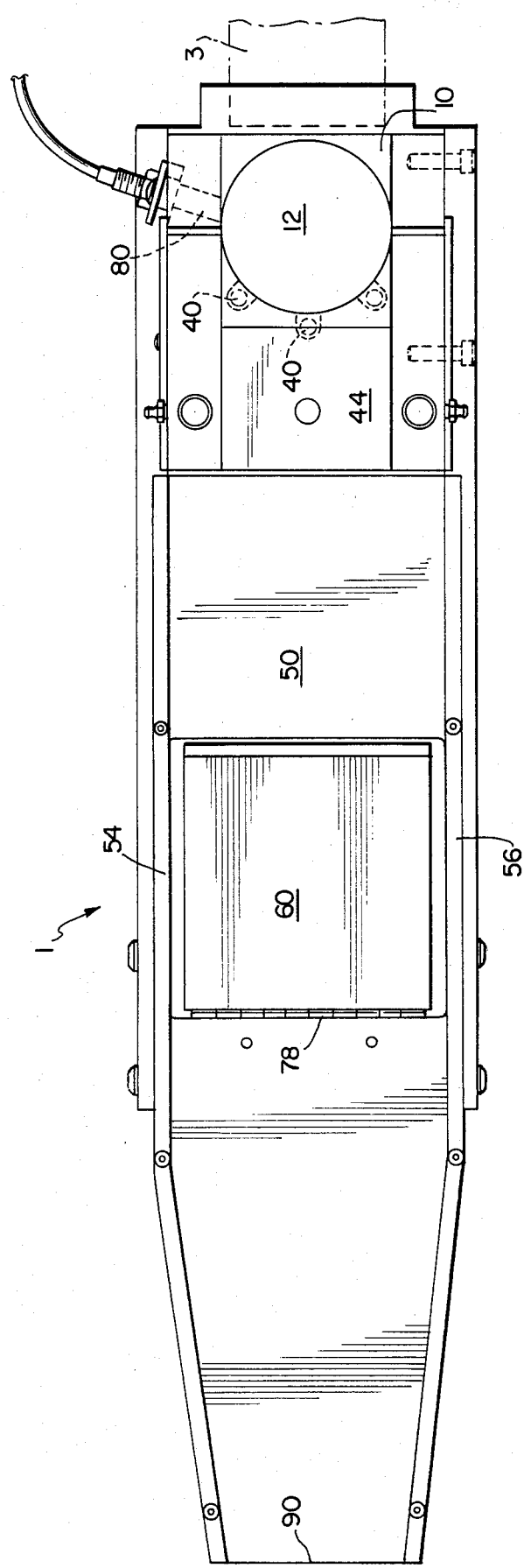
FIG. 2 is a top view of the can end sampler.

Turning now to the FIGURES, the can end sampler 1 of the present invention is illustrated adjacent to a continuous belt 3 passing around a pulley 5. Can ends from a can end forming line are passed along the top surface of the belt 3 and into the sampling device 1 of the present invention.

As illustrated, the sampling device 1 is arranged for acceptance of can ends to be discarded as scrap. During any start-up of an end press, the potential for defective ends to be formed is higher than normal, even if the press is operating properly. Thus, during start-up of an end press, the first several ends produced are collected as scrap.

As the ends leave the moving belt 3, they pass over a chute opening 12 in a base housing 10 of the end sampler 1 and are carried by their momentum onto surface 44 of deflector 42. Deflector 42 is in its sampling position, as will be more fully described below. The ends then pass along chute surface 50 and impinge upon deflector surface 74, passing through opening 51 in surface 50 and between deflectors 74 and 76 to scrap storage.

The strokes of the end press are counted. After a predetermined number of strokes, typically from 3 to 6 strokes, pressurized air is no longer supplied through line 72 to air cylinder 70. This causes piston rod 68 to retract toward piston 70 pulling brackets 62 and 66 and linkage 64 therebetween toward cylinder 70, lowering door 60 about hinge 78, such that any ends passing along surface 50 will exit from discharge point 90. A sensor 80 controls the level of the ends in base housing 10 by starting and stopping the discharge conveyor.

At the same time as air supply to air cylinder 70 ceases, pressurized air is supplied through line 28. This causes piston 20 and piston rod 18 associated therewith to move upwardly. Piston 20 is sealed within base 10 by means of sleeves 14, 16 and 22 and o-ring 24.

As piston rod 18 moves upwardly, ends exiting belt 3 no longer pass over deflector 42 along surface 44, but rather are now intercepted by deflector surface 46 and pass downwardly through opening 12 and into a discharge chute formed from rails 13 and face plate 15.

Ends exiting through rails 13 may be directed, for example, to another belt similar to belt 3 from which they entered the sampler 1, or they may pass along other conveying means well-known to those in the art for conveying ends to, for example, a packing station.

As previously mentioned, the major purpose of the apparatus 1 is to periodically sample can ends from production. As with the initial can ends which were passed to scrap, the end press strokes are counted and the resulting ends, one end per stroke, fall into opening 12. After a predetermined number of strokes have occurred, for example, in the order of 200 strokes, a counter (not shown) gives a signal to reverse compressed air flow from line 28 to line 30, causing air to flow through elbow 32 and inlet 34, forcing piston 20, piston rod 18 and deflector 42 downwardly. Alignment of deflector 42 is maintained during upward and downward movement through means of pins 40.

With deflector 42 again in its downward position and with door 60 closed, can ends pass from belt 3 over surfaces 44 and 50 and out exit point 90.

It should be noted that air is supplied to line 30 during start-up as previously mentioned, as well as during collection of sample ends.

Again, strokes of the end press are counted, and after a predetermined number of strokes have occurred, air supply is returned to line 28.

The ends passing through exit 90 may be collected for transport to a collecting station, or for other purposes. Preferably, however, exit point 90 would be connected to the input of a can end tester, such as that disclosed in co-pending U.S. application Ser. No. 508,081 filed June 27, 1984, such that can ends are tested substantially in-line with their production.

A cover 52 may cover the conveying surface 50 and sidewalls 54 and 56 of chute 48, and is preferably formed of a material such as Plexiglass ®, so that observation of system operation may be made.

From the foregoing, it is clear that the present invention provides a means for controlling can end movement in a can end forming line which permits sample ends to be isolated from production and which may also permit known potentially defective ends to be isolated from normal production.

While the present invention has been described with reference to certain specific embodiments thereof, it is not intended to be so limited thereby, except as set forth in the accompanying claims.

We claim:

1. Apparatus for controlling can end flow from a generally horizontal input path comprising a first deflector, means for vertically reciprocating said first deflector between an upward and a downward position, said first deflector having a generally horizontal surface over which said can ends pass without being affected in their movement by said first deflector when said deflector is in its downward position and said first deflector having a generally vertical deflecting surface against which said can ends impinge to stop their horizontal movement and to guide said can ends in a vertical direction by gravity when said first deflector is in its upward position, said generally horizontal surface and said generally vertical surface each maintaining their respective attitudes between said upward and said downward position, a first chute for capturing said can ends which impinge against said generally vertical deflecting surface of said first defelctor, a conveying surface for said can ends which pass over said first deflector, a second deflector having a deflecting surface against which said can ends conveyed by said conveying surface impinge to stop their horizontal movement when said second deflector is in an open position and a surface over which said can ends pass without being affected in their movement by said second deflector when said second deflector is in a closed position, means for controlling said second deflector between said open and said closed positions and a second chute for capturing said can ends which are impinged against the deflecting surface of said second deflector.

2. The apparatus of claim 1 wherein said means for controlling said first deflector comprises an air cylinder.

3. The apparatus of claim 1 wherein said first chute comprises a plurality of rails.

4. The apparatus of claim 1 wherein said second deflector comprises a door positioned within said conveying surface.

5. The apparatus of claim 1 wherein said means for controlling said second deflector comprises an air cylinder.

6. The apparatus of claim 1 further comprising a cover for said conveying surface.

* * * * *